United States Patent
Yan

(10) Patent No.: US 10,181,033 B2
(45) Date of Patent: Jan. 15, 2019

(54) METHOD AND APPARATUS FOR MALWARE DETECTION

(71) Applicant: Nokia Technologies Oy, Espoo (FI)

(72) Inventor: Zheng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 15/104,740

(22) PCT Filed: Dec. 30, 2013

(86) PCT No.: PCT/CN2013/090887
§ 371 (c)(1),
(2) Date: Jun. 15, 2016

(87) PCT Pub. No.: WO2015/100538
PCT Pub. Date: Jul. 9, 2015

(65) Prior Publication Data
US 2017/0004303 A1   Jan. 5, 2017

(51) Int. Cl.
*G06F 12/14* (2006.01)
*G06F 21/56* (2013.01)
*H04L 12/58* (2006.01)

(52) U.S. Cl.
CPC ............ *G06F 21/56* (2013.01); *G06F 21/562* (2013.01); *G06F 21/566* (2013.01); *H04L 51/12* (2013.01)

(58) Field of Classification Search
None
See application file for complete search history.

(56) References Cited

U.S. PATENT DOCUMENTS

| 8,434,151 B1 | 4/2013 | Franklin |
| 2007/0136455 A1* | 6/2007 | Lee ........................ G06F 21/564 709/223 |

(Continued)

FOREIGN PATENT DOCUMENTS

| CN | 102034042 A | 4/2011 |
| CN | 103369532 A | 4/2011 |

(Continued)

OTHER PUBLICATIONS

International Search Report and Written Opinion received for corresponding Patent Cooperation Treaty Application No. PCT/CN2013/090887, dated Sep. 30, 2014, 12 pages.

(Continued)

*Primary Examiner* — Brandon S Hoffman
(74) *Attorney, Agent, or Firm* — Mintz Levin Cohn Ferris Glovsky and Popeo, P.C.

(57) ABSTRACT

An approach is provided for providing an offline malware detection, and in addition a real-time malware detection. The offline malware detection may comprise: detecting at least one of function calling map of the application offline, wherein a function calling map records relationships of callings among functions called by the application; extracting patterns of the function callings of the application from the at least one function calling map; and comparing the extracted pattern with at least one basic pattern of normal applications. The real-time malware detection may comprises: running an application in a real environment; recording behaviors of the application at runtime of the application; extracting behavior patterns from the recorded behaviors; and comparing the extracted behavior patterns with at least one of basic patterns of normal applications or patterns previously recorded for the application.

17 Claims, 6 Drawing Sheets

(56) References Cited

U.S. PATENT DOCUMENTS

| | | | |
|---|---|---|---|
| 2010/0031353 | A1 | 2/2010 | Thomas et al. |
| 2010/0180344 | A1 | 7/2010 | Malyshev et al. |
| 2011/0320816 | A1 | 12/2011 | Yao et al. |
| 2012/0260342 | A1 | 10/2012 | Dube et al. |
| 2013/0042294 | A1 | 2/2013 | Colvin et al. |
| 2013/0091571 | A1* | 4/2013 | Lu .................... G06F 21/563 726/23 |
| 2013/0198842 | A1* | 8/2013 | Klein ................ G06F 21/562 726/23 |
| 2013/0227636 | A1 | 8/2013 | Bettini et al. |
| 2013/0227683 | A1 | 8/2013 | Bettini et al. |

FOREIGN PATENT DOCUMENTS

| | | |
|---|---|---|
| GB | 2470928 A | 12/2010 |
| JP | 2004-038273 A | 2/2004 |
| JP | 2009-181335 A | 8/2009 |
| JP | 2009-237610 A | 10/2009 |
| JP | 2010-267128 A | 11/2010 |
| JP | 2012-221170 A | 11/2012 |
| JP | 2012-529690 A | 11/2012 |
| WO | 2013/142228 A1 | 9/2013 |

OTHER PUBLICATIONS

Sahs et al., "A Machine Learning Approach to Android Malware Detection", European Intelligence and Security Informatics Conference, Aug. 22-24, 2012, pp. 141-147.

Egele et al., "A Survey on Automated Dynamic Malware-Analysis Techniques and Tool", ACM Computing Surveys, vol. 44, No. 2, Feb. 8, 2012, pp. 1-42.

Chandramohan et al., "Detection of Mobile Malware in the Wild", IEEE Computer, vol. 45, No. 9, Sep. 2012, pp. 65-71.

Felt et al., "A Survey of Mobile Malware in the Wild", Proceedings of the 1st ACM workshop on Security and privacy in smartphones and mobile devices, Oct. 17, 2014, pp. 3-14.

Schmidt et al., "Detecting Symbian OS Malware Through Static Function Call Analysis", 4th International Conference on Malicious and Unwanted Software (MALWARE), 2009, pp. 15-22.

Egele et al., "PiOS: Detecting Privacy Leaks in iOS Applications", 18th Annual Network and Distributed System Security Symposium, Feb. 6-9, 2011, 15 pages.

Enck et al., "A Study of Android Application Security", Proceedings of the 20th USENIX conference on Security, Aug. 8-12, 2011, 16 pages.

Enck et al., "TaintDroid: An Information-Flow Tracking System for Realtime Privacy Monitoring on Smartphones", Proceedings of the 9th USENIX conference on Operating systems design and implementation, Oct. 4-6, 2010, 15 pages.

Blasing et al., "An Android Application Sandbox System for Suspicious Software Detection", 5th International Conference on Malicious and Unwanted Software, Oct. 19-20, 2010, pp. 55-62.

Enck et al., "On Lightweight Mobile Phone Application Certification", Proceedings of the 16th ACM conference on Computer and communications security, Nov. 9-13, 2009, pp. 235-245.

Barrera et al., "A Methodology for Empirical Analysis of Permission-Based Security Models and Its Application to Android", Proceedings of the 17th ACM conference on Computer and communications security, Oct. 4-8, 2010, pp. 73-84.

Felt et al., "The Effectiveness of Application Permissions", Proceedings of the 2nd USENIX conference on Web application development, Jun. 15-16, 2011, pp. 1-12.

Yan et al., "TruBeRepec: A Trust-Behavior-Based Reputation and Recommender System for Mobile Applications", Personal and Ubiquitous Computing, vol. 16, No. 5, Jun. 2012, pp. 485-506.

Leskovec et al., "Graph Evolution: Densification and Shrinking Diameters", ACM Transactions on Knowledge Discovery from Data (TKDD), vol. 1, No. 1, Mar. 2007, pp. 1-41.

Office action received for corresponding Japanese Patent Application No. 2016-541324, dated Jul. 3, 2017, 9 pages of office action and 9 pages of office action translation available.

Extended European Search Report received for corresponding European Patent Application No. 13900779.3, dated Jul. 27, 2017, 8 pages.

* cited by examiner

METHOD AND APPARATUS FOR MALWARE DETECTION

RELATED APPLICATION

This application was originally filed as Patent Cooperation Treaty Application No. PCT/CN2013/090887 filed Dec. 30, 2013.

FIELD OF THE INVENTION

The present invention generally relates to computer and network security. More specifically, the invention relates to malware detection.

BACKGROUND

The mobile device has evolved into an open platform for executing various applications. An application, also referred to as an "app", generally refers to a software application that is executable on a computing device, such as a mobile device. Apps, especially mobile apps, enhance many of our daily activities, for example, by providing instant access to the wealth of information over the Internet and offering various functionalities. The fast growth of mobile apps plays a crucial role for the success of the future mobile Internet and economy. There are more than 1 million mobile apps nowadays and about 2000 new apps are shipped into markets every day.

However, mobile apps could be malicious, buggy, running unexpectedly or bringing a security hole to the mobile devices. Moreover, a malicious app may threaten other hosts connected to the Internet as well as the mobile and wireless communication network nodes. A mobile malware refers to malicious software which exhibits malicious behaviors in mobile devices. The malicious behaviors of mobile malwares may be broadly categorized to include viruses, botnets, worms, and Trojan horses resident in mobile devices. Initially, it highlights a mobile communication system's security vulnerabilities. Recently, malicious mobile code has become a channel to gain financial benefits on a large scale by stealing user credentials, selling user information, manipulating content delivery and sending SMS spam, for example. What mobile apps are trustworthy for a user to consume becomes a crucial issue that impacts the final success of apps and the mobile Internet, and influences the economy related to mobile networking.

Thus, it would be advancement in the art to provide methods and systems that allow for detecting malwares effectively and efficiently.

SOME EXAMPLE EMBODIMENTS

To overcome the problem described above, and to overcome the limitations that will be apparent upon reading and understanding the prior arts, the disclosure provides an approach for detecting malwares offline and/or at runtime effectively and efficiently.

According to one embodiment, a method comprises causing an offline malware detection on an application. The offline malware detection comprises detecting at least one function calling map of the application offline, wherein a function calling map records relationships of callings among functions called by the application; extracting patterns of function callings of the application from the at least one function calling map; and comparing the extracted pattern with at least one basic pattern of normal applications. A result of the offline malware detection may be announced to indicate potential malicious threats from the application.

In an exemplary embodiment, the detecting may comprise running at least part of codes of the application in a virtual environment and acquiring logs of the function callings of the application. The extracting may comprise using a data mining method to analyze the logs.

In an exemplary embodiment, the at least one function calling map may comprise at least one of the following three types of function calling map: a complete calling map that contains all relationships of callings among functions available to be called by the application throughout the running; a calling map at a different time that contains relationships of callings among functions called by the application before a time point of the different time during the running; and a partial calling map that contains relationships of callings among functions called by the application in a time period during the running.

In an exemplary embodiment, the offline malware detection may further comprise re-compiling at least part of execution codes of the application by adding a function module for acquiring logs of the function callings, and running the re-compiled codes in the virtual environment to acquire the logs.

In an exemplary embodiment, the method may further comprise scheduling the offline malware detection of the application according to a reputation of the application. An application with a higher reputation may be scheduled to take the offline malware detection in prior to an application with lower reputation.

In an exemplary embodiment, the method may further comprise causing a real-time malware detection on the application while the application is executed in a real environment. The real-time malware detection comprises recording behaviors of the application during the execution of the application; extracting behavior patterns from the recorded behaviors; and comparing the extracted behavior patterns with at least one of basic patterns of normal applications or patterns previously recorded for the application. The recorded behaviors may comprise at least one of the following three types of behaviors: behaviors associated with function callings of the application, behaviors associated with local data access caused by the application, and behaviors associated with inbound and/or outbound traffic raised by the application. The real-time malware detection may further comprise re-compiling at least part of execution codes of the application by adding a function module for acquiring logs of the behaviors of the application.

According to another embodiment, a method comprises running an application in a real environment; recording behaviors of the application at runtime of the application; extracting behavior patterns from the recorded behaviors; and comparing the extracted behavior patterns with at least one of basic patterns of normal applications or patterns previously recorded for the application.

According to another embodiment, an apparatus comprising at least one processor, and at least one memory including computer program code, the at least one memory and the computer program code configured to, with the at least one processor, cause, at least in part, the apparatus to run an application in a real environment; record behaviors of the application at runtime of the application; extract behavior patterns from the recorded behaviors; and compare the extracted behavior patterns with at least one of basic patterns of normal applications or patterns previously recorded for the application.

According to another embodiment, a computer-readable storage medium carrying one or more sequences of one or more instructions which, when executed by one or more processors, cause, at least in part, an apparatus to perform one of the methods discussed above.

According to another embodiment, an apparatus comprises means for performing one of the methods discussed above.

A computer program product including one or more sequences of one or more instructions which, when executed by one or more processors, cause an apparatus to at least perform one of the methods discussed above.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details may be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DETAILED DESCRIPTION OF THE INVENTION

Figure 1:
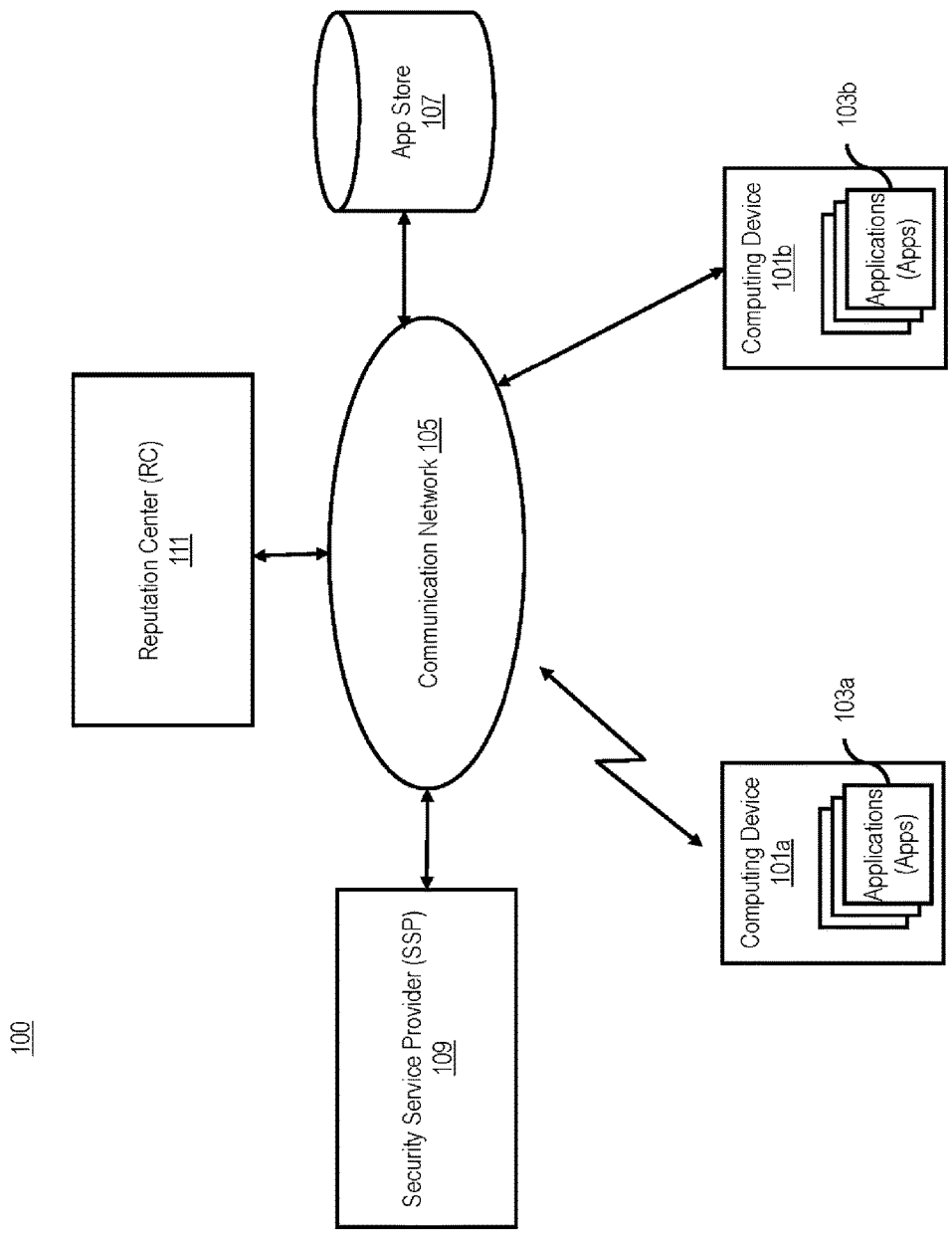
FIG. 1 illustrates an architecture for detecting malwares for mobile devices according to some embodiments of the present invention.

Examples of a method, apparatus, system and computer program for providing malware detections are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Like reference numerals refer to like elements throughout.

In the following, a mobile device will be used as one example of a computing device threaten by malwares, but other types of computing devices such as laptop computers, desktop computers, home automation and/or control devices are also possible. Furthermore, mobile malware will be used in the description, but other types of malwares, including but not limited to malwares on laptop computers or unknown malwares, are also possible.

Taking security as the main concern, it is a formidable task to keep track of all apps by studying each app in order to find out whether the app is malicious or benign. Many app stores use download stats to show trust or reputation of apps for recommendations. But a study found that 26% of mobile apps are tried once and then discarded after downloading. Obviously, tracking downloads is not accurate at all to gauge an app's success and security since download stats often provide an incomplete and inflated view. Due to the huge number of apps, it is pretty hard to detect malwares efficiently and effectively. First, the huge number of applications makes it hard and costly for the security service provider (e.g., F-secure, 360 in China, etc.) to verify each application's security and decide which one should be validated with priority. Second, some applications could become malicious after installation and usage for a while. At present, there are no good solutions to detect mobile malwares in a dynamic way at runtime.

Many techniques for detecting malware have been proposed, most of them highlighted in a comprehensive survey. However, the research on mobile malwares is still in its infancy. Malware detection techniques may be classified into the following categories. The techniques available for detecting mobile malwares and other security vulnerabilities have varying strengths and weaknesses.

(1) Static Analysis

Static analysis is the way to find malicious characteristics or bad code segments in an application without executing them. They are generally used in a preliminary analysis, when suspicious applications are first evaluated to detect any obvious security threats. One kind of static malware detection technique firstly disassembles the mobile application and extract system calls (feature extraction). It then use Centroid Machine, a lightweight clustering mechanism, to classify the mobile application as either malicious or benign (anomaly detection). A second kind of static malware detection technique performs static taint analysis by firstly disassembling the mobile application and constructing a control flow graph (CFG). The analysis considers paths originating from sensitive sources, such as the address book, current GPS coordinates, keyboard cache, unique device ID, and other phone-related information. Dataflow analysis checks for any sensitive data transmitted from the source to synch without notifying the user and thus causing privacy leaks. This method may only detect privacy leaks within a single application, and it fails if two or more applications are transitively chained together. A third kind of static malware detection technique uses a decompiler (e.g. for Android codes) to generate Java source code from an application's installation image and then uses a static code analysis suite, to evaluate the recovered source code. This technique limits to those that use a relatively small number of permissions and API calls.

The static analysis is a quick and inexpensive approach, but is hard to detect security threats caused by code self-modifying after running well for a long time and then behaving maliciously suddenly. It cannot overcome the attacks or intrusion caused by a mobile botnet master or a botnet or a virus.

(2) Dynamic Analysis

Dynamic analysis involves executing the mobile application in an isolated environment, such as a virtual machine or emulator, so that researchers may monitor the application's dynamic behavior. Researchers primarily use dynamic analysis in taint tracking or system call tracing. For example, TaintDroid provides system-wide dynamic taint tracking for Android. The mobile application passes to the Dalvik virtual machine to perform four granularities of taint propagation: variable, method, message, and file-level. Taint tracking marks any ambiguous data that originates from sensitive sources, such as location, microphone, camera, and other phone identifiers. This technique modifies the native library loader to ensure that all the native libraries are called from the virtual machine, thus preventing distrusted applications from executing native methods directly. Finally, dynamic analysis screens impacted data for any potentially sensitive data leaks before it leaves the system at the network interface—a taint sink. However, TaintDroid might suffer from false negative and false positive results; in addition, it focuses solely on dataflow and doesn't consider other vulnerabilities. The Android Application Sandbox (AASandbox) system offers two-step analysis for Android applications. The mobile application passes to AASandbox, where it performs static and dynamic analyses in offline mode. Static analysis disassembles the application image binary and uses the disassembled code to search for any suspicious patterns (http://bit.ly/171MnI). Dynamic analysis executes the binary in an Android emulator and logs the system calls. Although the researchers used Android Monkey (ADB Monkey) to generate inputs, this isn't as effective as testing with real users. Furthermore, this approach hasn't been tested against malware that exhibits polymorphic behavior or code fragment encryption.

This substantial quantity requires an automated approach to quickly differentiate between samples that deserve closer (manual) analysis, and those that are variations of already known threats. This automatic analysis may be performed in two ways. Dynamic analysis refers to techniques that execute a sample and verify the actions this sample performs in practice, while static analysis performs its task without actually executing the sample. Whereas static analysis has the potential to cover all possible execution flows through a program, dynamic analysis suffers from the problem of incomplete path coverage.

(3) Application Permission Analysis

Application permission analysis aims to find malicious behaviors of mobile apps through permission checks. For example, Kirin is an application certification for a platform of Android. Kirin performs a permission check on the application during installation. When a user installs an application, Kirin extracts its security configurations and checks them against the security policy rule that it already has. If an application fails to pass all the security policy rules, Kirin can either delete it or alert the user. Kirin solely checks the application author's permission requests and doesn't examine how the application uses these permissions. It could be ineffective to check a security hole of some apps that maliciously disclose sensitive user data or introduce unwanted contents (with granted permissions).

(4) Cloud Based Detection

Because of limited computational power and energy sources, smartphones may not be capable of carrying fully featured security mechanisms, such as a simple file scanner. A cloud-based malware protection technique moves security analysis and computations to a remote server that hosts multiple replicas of mobile phones running on emulators. A tracer, located in the smartphone, records all the necessary information required to replay the mobile application's execution. The tracer transmits the recorded information to a cloud-based replayer, which replays the execution in the emulator. The replayer can deploy several security checks, such as dynamic malware analysis, memory scanners, system call anomaly detection, and commercial antivirus scanning, from the cloud's ample resources. But using this approach initially might cause false positive results as the sample size is still very small. Moreover, it isn't clear how users will react when they're asked to send application behavior to a third party, and a total dependence on user behavior might not produce accurate results. User privacy is also an open issue. This approach also has detection postpone. It cannot be applied in the case that the network connection is not available or ruined by the malware.

(5) Battery Life Monitoring

Because smartphones have limited battery capacity, observing energy consumption sometimes identifies malicious applications, which consume more energy than benign ones. If normal user behavior, current battery state, and other domain-specific details such as signal strength and network traffic are known, it's possible to detect hidden malicious activities more precisely. Unpredictable user behavior and malware-injected fake events can affect power model accuracy. Furthermore, this approach isn't applicable for smartphones with multitasking features.

As can be seen from the above, each type of approaches has its own shortcomings, and none is comprehensive. Furthermore, most existing approaches for mobile malware detection cannot detect mobile malwares at runtime in real-time. However, some malicious mobile apps could intrude a mobile device suddenly after being used for a long time or through code self-modifying. This threat challenges the research on trust management of mobile apps.

According to various exemplary embodiments, an efficient and effectively malware detection may be provided in an offline check, and additionally in a real-time check at runtime of an application. The "offline" check for malware means detecting abnormities in an application without actually executing the application in a real environment. In some embodiments, at least part of codes of an application to be checked may be run in a virtual environment, so as to acquire logs of function callings of the application. From the logs of function callings, a function calling map can be derived to reflect calling relationships between functions called by the application. A function calling map of an application contains nodes that represent functions called by the application and edges that indicate calling relationships among the nodes. An edge can be further weighted according to detailed information of its corresponding calling relationship, such as a calling density and a calling frequency. Through statistically analyzing the function calling maps, for example by data mining techniques, statistical characters or patterns of the function calling maps may be extracted. Then the extracted patterns or characters may be compared with basic patterns or rules of normal applications, in order to find abnormities in the checked application. As such, an offline malware detection may be conducted based on an analysis on a structure of function callings of applications automatically. The result of the offline malware detection may be announced, for example by issuing a security certificate indicative of potential malicious threats from the detected application, to assist users' decisions for application downloads.

In some embodiments, even though an application (either offline checked or not) has been downloaded, installed and then actually executed on a mobile device in a real environment, the mobile device may automatically detect malicious behaviors of the application. In this regard, execution behaviors of the applications at its runtime may be mined in real-time, for extracting patterns or statistical characters.

The extracted patterns may be compared with normal patterns and previously recorded patterns of the application, in order to find abnormities. Some malicious applications may run normally for a while after been installed, but become malicious suddenly after achieving user's trust. Then the comparison of patterns may effectively detect this kind of potential threats. This provides a comprehensive way to detect malwares.

In some embodiments, reputations of respective applications may be used for automatically driving offline malware detection. In this regard, a basic idea is that the most reputable applications without being detected for malware need to be carefully analyzed to wipe off suspicion. A reputation of an application indicates a degree of trust and popularity of the application among users. For example, a higher value of reputation of an application means that the application is more trustworthy and popular. In some embodiments, according to usage behaviors of an application, a user individual trust in an application may be automatically generated, for example at a mobile device. Based on the individual user trust and other information regarding the application such as user feedbacks, a reputation of the application may be further generated. Based on the reputation of an application, a high reputable and popular (widely used) application that hasn't yet been checked is checked for malware prior to a low reputable and less-used application.

FIG. 1 is a functional block diagram of an architecture for detecting malwares for mobile devices according to some embodiments. As shown in FIG. 1, the system 100 comprises a computing device 101a having connectivity to an application store 107, a security service provider 109, a reputation center 111 and other communication entities (such as other computing devices 101b) via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), a self-organized mobile network, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), wireless local area network (WLAN), Long Term Evolution (LTE) networks, code division multiple access (CDMA), wideband code division multiple access (WCDMA), wireless fidelity (WiFi), satellite, mobile ad-hoc network (MANET), and the like.

The computing devices 101a, 101b (hereinafter referred as 101 in common) may be any type of devices capable of executing software applications, for example with a processor. For example, the computing devices 101 may be mobile devices such as smart phones, tablets, laptop computers, notebook, or Personal Digital Assistants (PDAs), fixed devices such as station, unit, multimedia computer, multimedia tablet, Internet node, or desktop computer, embedded devices, or any combination thereof. As shown in FIG. 1, computing devices 101 may download applications 103a, 103b, from the application store 107, and execute the downloaded applications. Computing devices 101 may also be utilized to provide feedbacks of the usage of applications to the application store 107, or other party such as a reputation center 111 and/or other entities.

Application stores 107 may cache and manage various applications for upload, download, update, and the like. For example, for smart phones, there exists a plurality of application stores for different operating systems, such as Windows Phone system, Android system, and iOS system. Although only one application store is shown in FIG. 1, any numbers of application stores may be provided.

A security service provider (SSP) 109 is provided for scanning a plurality of applications offline to detect application abnormities and malwares. In some embodiments, the SSP 109 may download an application to be scanned directly or indirectly from the application stores 103. However, it should be understood that the SSP 109 may obtain execution codes of an application to be scanned from any sources of applications, such as developers of software applications, enterprises, government organizations, users and/or other entities. The results of the scanning or malware detection may be issued to assist users for making decisions on application downloads. For example, there exists a plurality of enterprises or organizations that provide security services of software applications, such as F-secure, 360, etc. In some embodiments, SSP 109 may be embodied as a server of such enterprises or organizations for checking securities of software applications or be deployed as a public or private cloud service that can be accessed by any other parties. In some embodiments, SSP 109 may even be deployed at a computing device which is also capable of actually executing these applications by itself.

In addition, the offline malware detection or scanning in SSP 109 may be conducted based on reputation ranks of these applications. In an instance where there are a huge number of applications, it may be hard and costly for the SSP 109 to verify each application's security. Then, it is necessary to decide which one should be checked with priority. According to the reputation ranks, the most reputable and popular applications may be checked first to wipe off suspicion.

A reputation center (RC) 111 may be provided to generate reputations of applications and provide it to SSP 109. RC 111 collects information correlated to usages of applications, and feedbacks on applications from users, for example from the computing devices of the users. According to this information, a reputation value of an application may be generated to reflect the trustworthiness and popularity of the application. RC 111 may be deployed at a cloud service provider serving SSP 109, or otherwise be corporate in the application store 107 or SSP 109.

Figure 2:
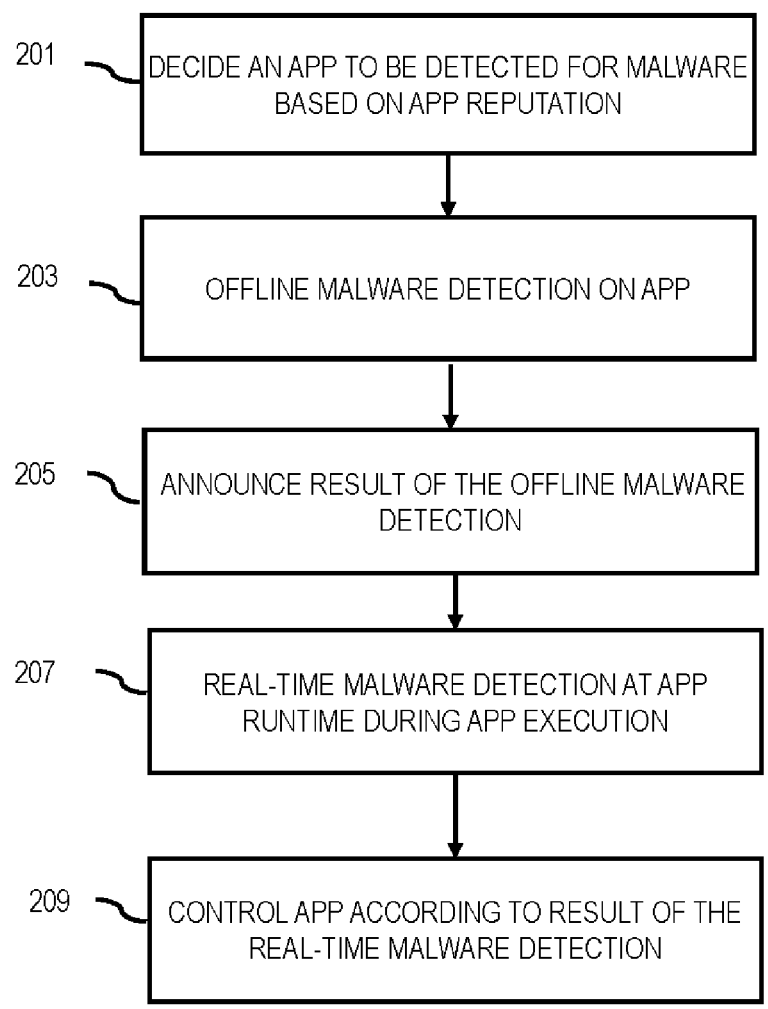
FIG. 2 is a flowchart illustrating a procedure for a comprehensive malware detection according to some embodiments of the present invention.

FIG. 2 is a flowchart of a procedure for a comprehensive malware detection according to some embodiments. The comprehensive malware detection comprises two stages, namely an offline malware detection and a real-time malware detection. At 203, an offline malware detection may be conducted on an application. For example, it may be done by a toolkit at the SSP 109. The SSP 109 may check if there is any abnormality in function callings of the application. The detailed procedure of the offline malware detection will be described later with reference to FIG. 4.

Results of the malware detection may be announced, for example by issuing a certificate of checking results (either positive or negative) at 205. If a result of the malware detection is negative, i.e. there exist some abnormities in the application, the SSP 109 may announce the detected problems and certify the detection result. If a result of the malware detection is positive, the SSP 109 may issue a certificate to certify the positive check result. The results may be provided to users to assist a decision on whether or not download the application to their mobile devices 101. The results may be further provided to the application store 107 to assist a management on the application, such as pull the application off shelves and/or develop a patch for the application. With the offline malware detection, it is possible to wipe out some malwares before coming into usage.

The offline malware detection may be scheduled according to reputations of respective applications. In some embodiments, the SSP 109 may be configured to check an application with a higher reputation in priority among a plurality of applications. For example, RC 111 may decide an application with higher reputation which needs to be checked for malwares, and then trigger an offline malware detection on the application at the SSP 109.

If an application passes the offline malware detection, and is actually executed in a real environment, for example in the computing device 101a, a real-time malware detection can be conducted on the application at 207. The computing device 101a may monitor application behaviors at runtime of the application, such as function callings, data accessing behaviors and networking behaviors, and check if these behaviors are normal. The detailed procedure of the real-time malware detection will be described later with reference to FIG. 5.

If the result of the real-time malware detection is negative, i.e. if there exist abnormalities in the application behaviors, the computing device reacts to control the detected malicious application at 209. For example, a user of the computing device may be informed to remove the application, or take a corresponding action.

Figure 3:
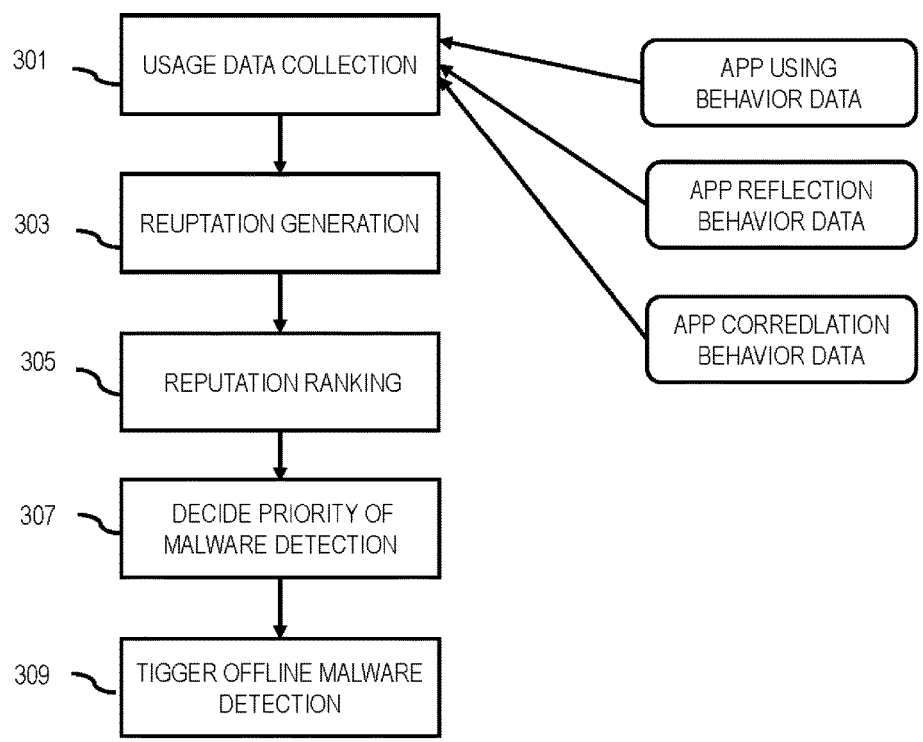
FIG. 3 illustrates a procedure for driving an offline malware detection by reputation evaluation according to some embodiments of the present invention.

As discussed above, an offline malware detection may be driven by a reputation evaluation. FIG. 3 illustrates such a procedure according to some embodiments. At 301, RC 111 may collect usage data of users for applications, for example from mobile devices 101. The usage data may include app using behavior data that relate to normal application usages, which may be reflected mainly by elapsed usage time, number of usages, and usage frequency; app reflection behavior data that concern the usage behaviors after a user confronts application problems/errors or has good/bad usage experiences; and app correlation behavior data that concern the usage behaviors correlated to a number of applications functioned similarly. Based on the collected usage data, a trust level indicative of individual users' trust in an application may be determined. Based on a trust level of an application, and/or user subjective feedback, a reputation of the application may be generated at 303. There exist many algorithms for generating or evaluating reputations. For example, some algorithms are described in the inventor's paper entitled "TruBeRepec: A Trust-Behavior-Based Reputation and Recommender System for Mobile Applications" (Z. Yan, P. Zhang, R. H. Deng, Journal of Personal and Ubiquitous Computing, Springer, Vol. 16, Issue 5, pp. 485-506, 2012). Other approaches for generating or evaluating app reputations, now known or later developed, may also be used.

According to the reputations of respective applications, RC 111 may rank applications to be detected for malwares, for example in descending order by reputation values, at 305. Then, RC 111 may decide the priority of malware detection for applications that haven't been checked at 307. For example, the first N ranked (N is a detection threshold) applications may be decided to accept an offline malware detection in priority. At 309, the decision may trigger the SSP 109 to load the codes of these decided applications one by one for checking, e.g. by an offline malware detection toolkit at the SSP 109.

With the app reputation evaluation, it is easy for the SSP 109 to reasonably arrange schedules for offline malware detections. The SSP 109 may focus on checking most valuable applications with high reputation and popularity. This may assist the cost saving of SSP 109 and make the malware detections more efficient. For example, for disliked applications, the SSP 109 won't need to be in a hurry or is unnecessary to detect their problems. For popular applications, the SSP 109 may check its security as early as possible, in order to greatly reduce the potential risk caused by them. Then SSP 109 is allowed to focus on the market demand.

Figure 4:
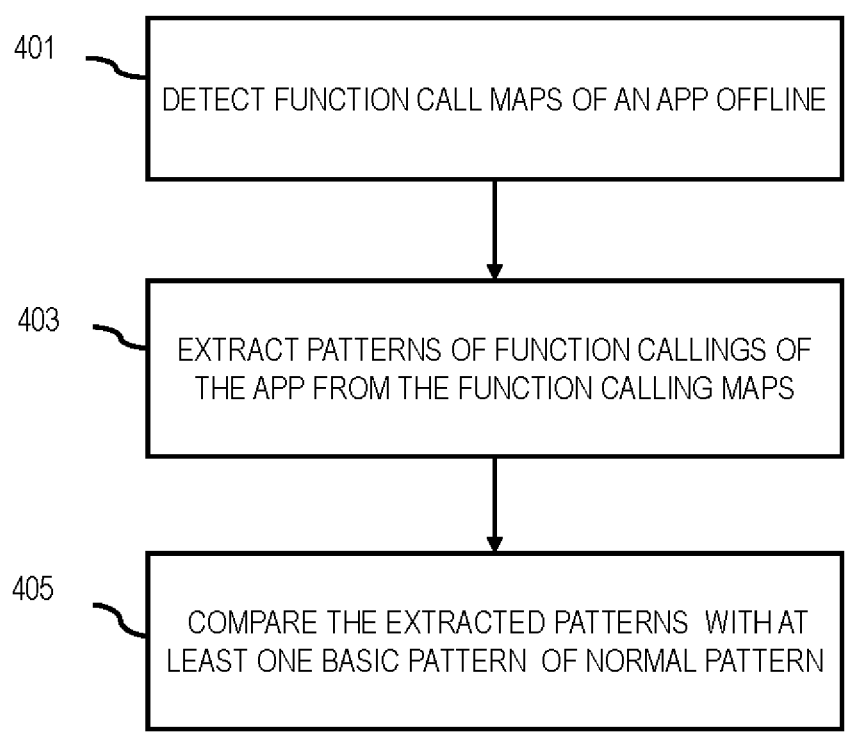
FIG. 4 is a flowchart for an offline malware detection according to some embodiments of the present invention.

Referring to FIG. 4, a procedure of offline malware detection will now be described. In the offline malware detection, a structure of function callings of an application is analyzed in order to find abnormities in the application. At 401, function calling maps of the application are detected offline. A function calling map may record relationships of callings among functions called by an application. It may contain nodes that represent functions called by the application and edges that link the nodes to indicate function calling relationships between the nodes. The edges may further have directions to indicate the calling direction and order. The functions in the map may be any function called by the application, including functions and sub-functions designed and partitioned by the application itself. Alternatively or additionally, the functions in the map may include service functions provided by other applications, and/or system-level functions or services provided by a underground operating system, such as phonebook functions of a mobile phone, photo taking functions, networking functions, positioning functions, and the like. A coarse-grained function represented by a node may further comprise a set of fine-grained functions. Edges between two nodes may be further weighted according to properties of the callings between the two functions represented by the two nodes. For example, the edges may be weighted based on calling densities and the calling frequencies.

In some embodiments, execution codes of the application may be decompiled, and be re-compiled so as to facilitate an acquirement for logs of function callings. For example, the application may be embedded with a function module for acquiring logs of function callings by using a toolkit. Through running the re-compiled execution codes of the application in a virtual environment, logs of function callings of the application may be obtained offline. Based on the function calling logs, function calling maps of the application may be derived and analyzed to find abnormity in the application.

At 403, from the function calling maps, patterns of the function callings of the application may be extracted. For example, SSP 109 may use data mining technologies to mine the function calling logs automatically. It is effective to extract patterns of function callings for detecting app abnormities. Next at 405, SSP 109 may compare the extracted pattern with a basic pattern or rule of normal applications, to determine whether the extracted patterns accord with the basic pattern or rule. For example, if there is significant difference between the extracted pattern and a basic pattern of a normal application, or if the extracted pattern doesn't follow the rules of normal applications, it may be determined that the detected application is abnormal and may be a malware.

At this stage, any dynamic and/or static method may be applied to conduct malware detection offline. In some embodiments, the SSP 109 may check different kinds of function calling maps, and analyzes calling relationships, calling orders, calling densities and the calling frequencies when the time goes by, in a dynamic and/or static manner. In this regard, the SSP 109 may check a complete calling map which contains all calling relationships among functions available to be called by the application throughout a complete simulation running. The complete calling map may be analyzed in a statistic manner, since the complete calling map is almost static for an application. The SSP 109 may determine if the complete calling map accords with basic patterns of normal applications, e.g., Scale-free and Small-world complex network with Power-law degree distribution.

Additionally or alternatively, calling maps at a different time, which contains calling relationships among functions called by the application before a time point of the different time during a simulation, may be checked. For example, a simulation of an application is assumed to run for ten minutes. A calling map at a different time may contain calling relationships among functions called by the application from the beginning of the simulation to a first minute, or to a second minute, or to a third minute, . . . , and so on. In contrast, a complete calling map may contain calling relationships among functions called by the application throughout the whole ten minutes. The SSP 109 may determine if a calling map at a different time accords with basic patterns of normal applications, e.g., Densification Power Law.

Additionally or alternatively, a partial calling map that contains calling relationships among functions called by the selected application in a time period during a simulation running. Taken the above-mentioned simulation as an example, a partial calling map may contain calling relationships between functions called by the application in a time period during a first two minutes, or a second two minutes, or a third two minutes, . . . , and so on. The partial calling map may be also analyzed to determine if it accords with some basic rules of normal applications, e.g., certain stable behavior patterns, such as a Densification Power Law.

Basic patterns of normal applications generally reflect natures that normal applications often involve. For example, In recent years, it has been discovered that real-world networks often exhibit a consistent tendency in their evolution, often expressed as: $e(t) \propto n(t)^a$, where $e(t)$ and $n(t)$ are the number of edges and nodes of the network at time t, and "a" is an exponent between 1 and 2. This relation is named as Densification Power Law. Some research found that all tested good software calling maps strictly obey the Densification Power Law during their growth. The Densification Power Law nature of a partial calling map is related to essential mechanisms of the software systems' dynamics. As such, if a partial calling map of an application has a large deviation from Densification Power Law, for example, it may be determined that the application is abnormal and may be a malware.

The pattern extraction and comparison at 403 and 405 may be conducted with regard to these different kinds of function calling maps, respectively. If there is any abnormality found, the SSP 109 may raise warning for additional check, e.g., going into a more stringent malware detection process.

Figure 5:
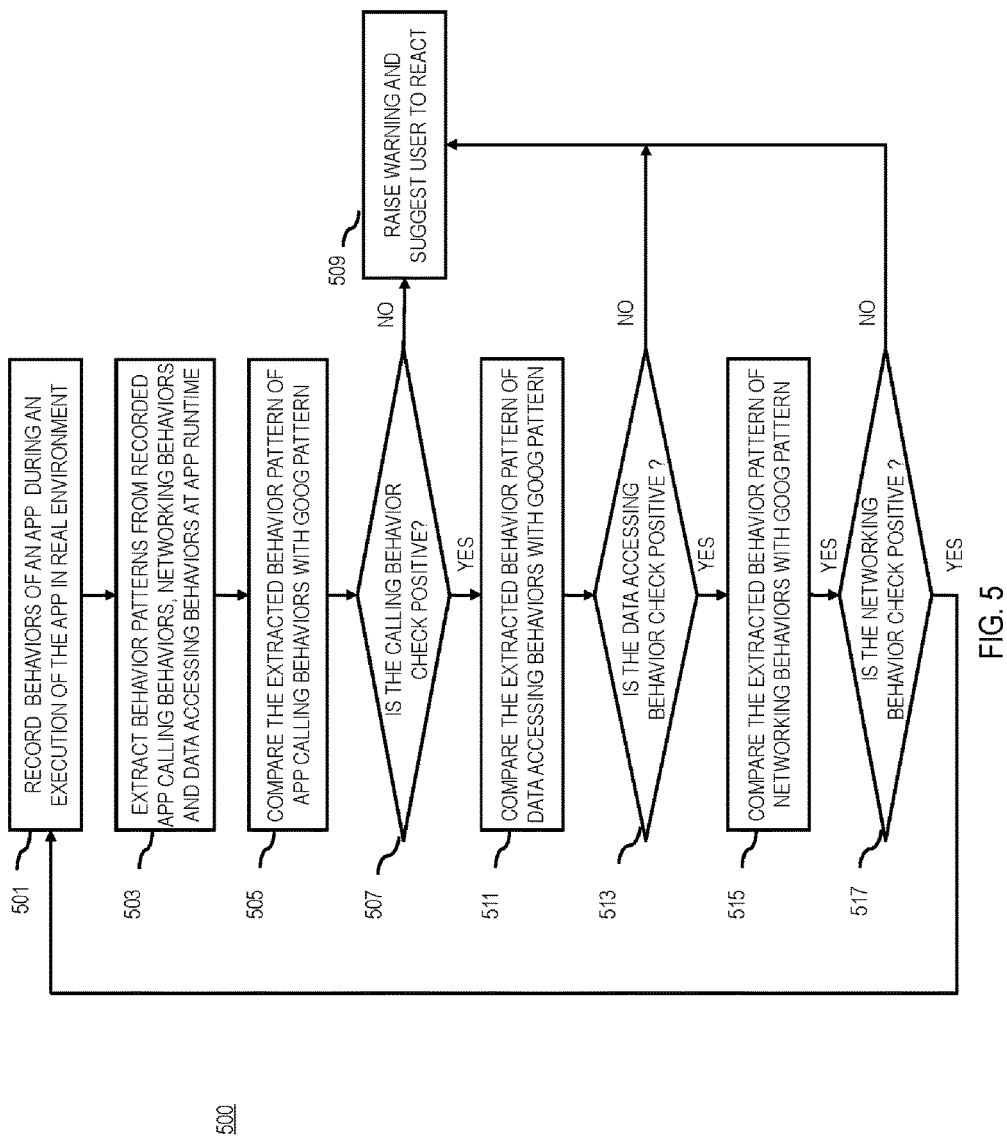
FIG. 5 is a flowchart for a real-time malware detection according to some embodiments of the present invention.
Figure 6:
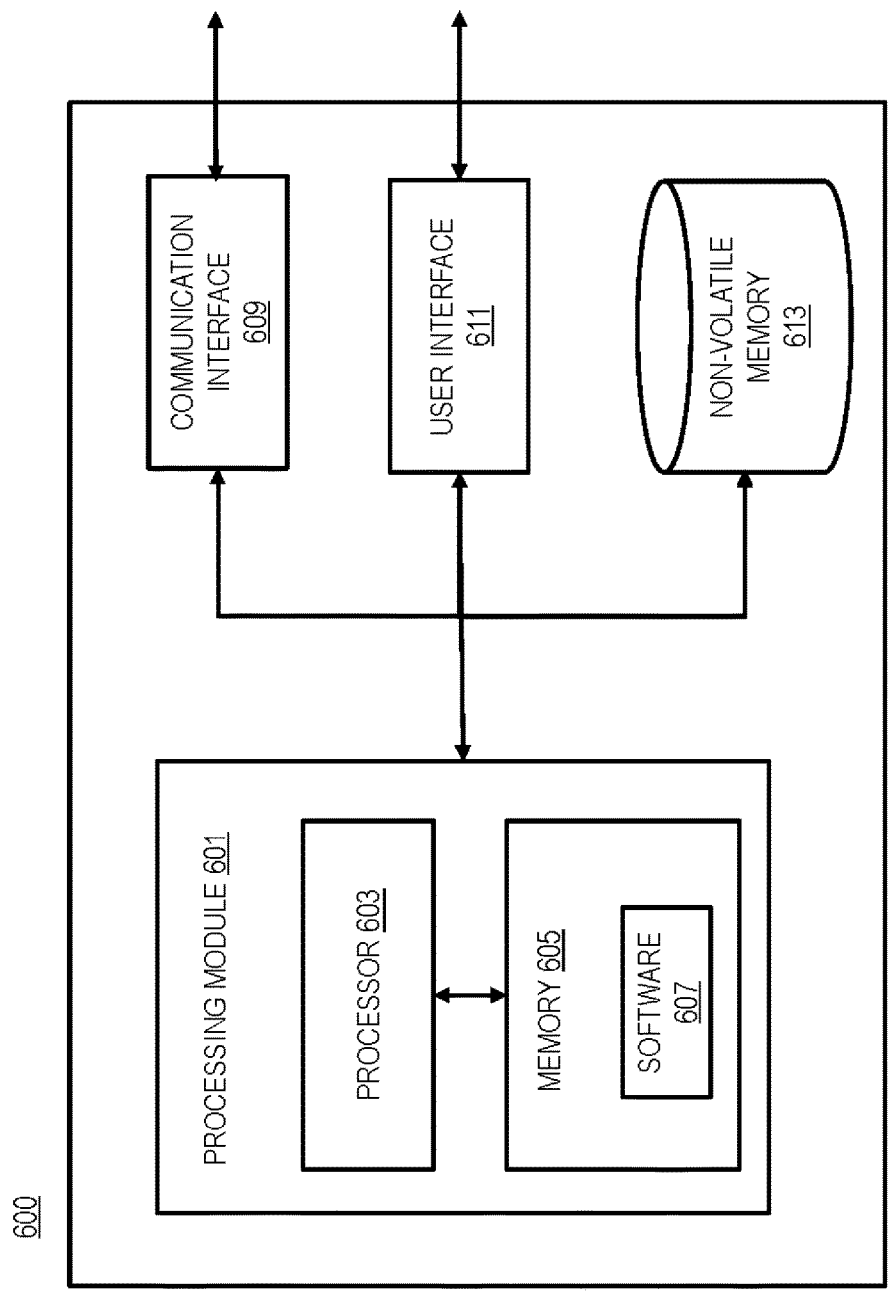
FIG. 6 illustrates an example block diagram of an apparatus in which various exemplary embodiments of the present invention may be applied.

In an instance where an application is installed and executed on a computing device, it is still possible to find malicious application behaviors at runtime according to some embodiments, even though a malicious application passed an offline malware check. The real-time malware detection can be conducted based on a mining from real-time app behaviors and a comparison with normal applications and/or previously records of app behaviors. Referring to FIG. 5, a procedure of a real-time malware detection will now be described. In such an embodiment, the process 500 is performed by one or more computing devices (such as the computing device 101*a*, 101*b*), and is implemented in, for instance, a chip set including a processor and a memory as shown in FIG. 6. As such, the computing device may provide means for accomplishing various parts of the process 500 as well as means for accomplishing other processes in conjunction with other components.

At 501, a computing device may record behaviors of an application which is actually executed at the computing device (for example by a processor of the computing device), at the runtime of the application for a time period. The recorded information of application behaviors may concern any operation, processing and data associated with a security of an application or the computer device. For example, at the app runtime, the computing device may records function calling behaviors associated with function callings, such as a partial calling map and calling maps at the current time. The computing device may further records data accessing behaviors associated with local data accesses, such as operations for reading data from memories of the computer device, operations for writing data to memories of the computer device, attributions (e.g. security level, size, etc.) of the accessed data. The computing device may further records networking behaviors associated with inbound and outbound traffic raised by the application, such as operations for initiating or terminating a communication connections with other network devices, communication ports and addresses for networking.

The application behaviors may be recorded through reading execution logs of the application at runtime. In some embodiments, in order to get the logs at runtime, the computing device may re-compile execution codes of the application, by adding a corresponding function module. Alternatively, the application re-compilation may be supported by the application store that sells the application.

At 503, from the recorded application behaviors, the computing device may extract behavior patterns at the runtime of the application, for example, through data mining technologies. It is efficient to mine app behaviors using data mining technologies automatically at runtime. Then, the extracted behavior patterns may be compared with good patterns, such as basic patterns or rules of normal applications, patterns analyzed in the past running time and/or offline for the detected application per se. If the application behaviors significantly differs from common normal applications or from its own previous behaviors (which seems to be normal), it may be determined that there are some abnormities in the application. As such, the risk of executing an app without offline check may be effectively reduced. Furthermore, for those malware that behave well for a while to gain user trust and then suddenly change its behavior to malicious, it is still possible to detect it at its runtime. Meanwhile, normal applications that could be infected by virus to become malicious after installation and execution can also be detected during app runtime.

For example, the computing device may compare (at 505) the partial calling map and the calling maps at current time with corresponding good patterns that are analyzed in the past running time and/or offline, and check (at 507) if the extracted patterns for calling behaviors accords with the corresponding good patterns. If the check result is negative, the computing device may raise a warning and suggest a user to react this abnormity, at 509.

If the check result at 507 is positive, the computing device may further compare (at 511) data accessing behaviors with corresponding good patterns that are analyzed in the past running time and/or offline, and check (at 513) if the extracted patterns for data accessing behaviors accords with the corresponding good patterns. If the check is negative, the device may raise a warning and suggest a user to react this abnormity, at 509.

Otherwise, if the check result at 513 is positive, the computing device may further compare (at 515) app networking behaviors with corresponding good patterns that are analyzed in the past running time and/or offline, and check (at 517) if the extracted patterns for data accessing behaviors accords with the corresponding good patterns. If the check is negative, the device may raises a warning and suggest a user to react this abnormity, at 509.

If each of above checks on application behaviors is positive, the process may go back to periodically monitor and analyze recorded app behaviors again, as shown by the connecting line from 517 to 501. Although the above checks are described in a certain order with reference to FIG. 5, it should be appreciated that these operations may be performed in alternative orders, and some operations may be adjusted, combined, or even omitted. For example, the checks for networking behaviors may be adjusted to be prior to or in parallel with the check for app calling behaviors.

Now reference is made to FIG. 6 illustrating an example block diagram of an apparatus 600 in which various embodiments of the invention may be applied. This may be a security service provider, or a computing device, such as a server, a user equipment (UE), a mobile terminal or other computing device. The general structure of the apparatus 600 comprises a processing module 601, a communication interface module 609 coupled to the processing module 601. The apparatus 600 may further comprise a user interface module 611 coupled to the processing module 601, and a non-volatile memory 613 coupled to the processing module 601. Also the communication interface module 609, the user interface module 611, and the nonvolatile memory 613 may communicate with each other.

The processing module 601 comprises a processor 603 and a memory 605. The processing module 601 further comprises software 607 stored in the memory 605 and operable to be loaded into and executed in the processor 603. The software 607 may comprise one or more software modules and may be in the form of a computer program product. The processing module 601 may comprise separate processing and memory areas for application software or data, and for normal operations of the apparatus 600.

The communication interface module 609 may be, e.g., a radio interface module, such as a WLAN, Bluetooth, GSM/GPRS, CDMA, WCDMA, or LTE (long term evolution) radio module. The communication interface module 609 may be integrated into the apparatus 600 or into an adapter, card or the like that may be inserted into a suitable slot or port of the apparatus 600. The communication interface module 609 may support one radio interface technology or a plurality of technologies. FIG. 6 shows one communication interface module 609, but the apparatus 600 may comprise a plurality of communication interface modules 609.

The processor 603 may be, e.g., a central processing unit (CPU), a microprocessor, a digital signal processor (DSP), a graphics processing unit, or the like. FIG. 6 shows one processor 603, but the apparatus 600 may comprise a plurality of processors.

The memory 605 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 600 may comprise a plurality of memories. The memory 605 may be constructed as a part of the apparatus 600 or it may be inserted into a slot, port, or the like of the apparatus 600 by a user. The memory 605 may serve the sole purpose of storing data, or it may be constructed as a part of an apparatus serving other purposes, such as processing data or taking malware detections. The non-volatile memory 613 may be for example a flash memory and may serve for example the purpose of receiving and storing software updates. The non-volatile memory 613 may be constructed as a part of the apparatus 600 or it may be inserted into a slot, port, or the like of the apparatus 600 by a user.

The user interface module 611 may comprise circuitry for receiving input from a user of the apparatus 600, e.g., via a keyboard, graphical user interface shown on a display of the apparatus 600, speech recognition circuitry, or an accessory device, such as a headset, and for providing output to the user via, e.g., a graphical user interface or a loudspeaker.

A skilled person appreciates that in addition to the elements shown in FIG. 6, the apparatus 600 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 600 may comprise a disposable or rechargeable battery (not shown) for powering the apparatus 600 when external power if external power supply is not available.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

Various features of various embodiments of the invention may provide various advantages. By checking malwares in both offline and at runtime according to some embodiments, one may reduce risk of malwares to minimum. During an offline malware detection, at least one of static complete calling maps, partial calling maps and calling maps at different time may be checked to find malware. During a real-time malware detection, calling map patterns may be checked to find security leaks caused by function callings. Furthermore, data accessing behaviors may be checked to find risky local data access, especially abnormal access that are different from the past. Furthermore, through a check on networking behaviors of an application, the inbound traffic of the application may be checked to find potential intrusions, and outbound traffic of the application may be checked to figure out possible infection caused by some sudden attacks, e.g., making the computing device to become a bot. As such, it is possible to handle malwares that steals and sells user information, manipulates content delivery, sends spam, or a sudden intrusion on computing devices, and provide a comprehensive detection and protection.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. A method, comprising:
  causing, by a network node, an offline malware detection on an application being downloaded and executed on one or more user devices, wherein the offline malware detection comprises:
    running, in a virtual environment, at least a portion of code of the application and acquiring logs of function calls of the application;
    deriving, based at least in part on the logs of function calls of the application, at least one function calling map of the application while offline, wherein a function calling map records relationships of calls among functions called by the application;
    extracting, from the at least one function calling map, patterns of function calls of the application; and
    comparing the extracted pattern with at least one pattern of normal applications to identify abnormalities with the application.

2. The method of claim 1, wherein the extracting comprises using data mining to analyze the logs.

3. The method of claim 2, wherein the at least one function calling map comprises at least one of the following:
  a complete calling map that contains all relationships of calls among functions available to be called by the application throughout the running;
  a calling map at a different time that contains relationships of calls among functions called by the application before a time point of the different time during the running; and
  a partial calling map that contains relationships of calls among functions called by the application in a time period during the running.

4. The method of claim 1, wherein the offline malware detection further comprises:
  re-compiling at least a portion of the code of the application by adding a function module for acquiring the logs of the function calls, and
  running, in the virtual environment, the re-compiled code to acquire the logs.

5. The method of claim 1, further comprising:
  scheduling the offline malware detection of the application according to a reputation of the application.

6. An apparatus comprising:
  at least one processor; and
  at least one memory including computer program code,
  the at least one memory and the computer program code configured to, with the at least one processor, cause the apparatus to at least:
    cause an offline malware detection on an application being downloaded and executed on one or more user devices, wherein the offline malware detection comprises:
      run, in a virtual environment, at least a portion of code of the application and acquire logs of function calls of the application;
      derive, based at least in part on the logs of function calls of the application, at least one function calling map of the application while offline, wherein a function calling map records relationships of calls among functions called by the application;
      extract, from the at least one function calling map, patterns of function calls of the application; and
      compare the extracted pattern with at least one pattern of normal applications to identify abnormalities with the application.

7. The apparatus of claim 6, wherein the extraction uses at least data mining to analyze the logs.

8. The apparatus of claim 7, wherein the at least one function calling map comprises at least one of the following:
  a complete calling map that contains all relationships of calls among functions available to be called by the application throughout the running;
  a calling map at a different time that contains relationships of calls among functions called by the application before a time point of the different time during the running; and
  a partial calling map that contains relationships of calls among functions called by the application in a time period during the running.

9. The apparatus of claim 6, wherein the offline malware detection further comprises:
  re-compile at least a portion of the code of the application by adding a function module for acquiring the logs of function calls, and
  run, in the virtual environment, the re-compiled code to acquire the logs.

10. The apparatus of claim 6, wherein the apparatus is further caused to at least:
  schedule the offline malware detection of the application according to a reputation of the application.

11. The apparatus of claim 10, wherein the application having a higher reputation is scheduled for the offline malware detection prior to another application with a lower reputation.

12. The apparatus of claim 6, wherein the apparatus is further caused to at least:
announce a result of the offline malware detection indicative of at least one potential malicious threat from the application.

13. The apparatus of claim 6, wherein the apparatus is further caused to at least: cause a real-time malware detection on the application while the application is executed in a real environment, wherein the real-time malware detection comprises:
record behaviors of the application during the execution of the application;
extract behavior patterns from the recorded behaviors; and
compare the extracted behavior patterns with at least one of patterns of normal applications or patterns previously recorded for the application.

14. The apparatus of claim 13, wherein the recorded behaviors comprises at least one of the following:
behaviors associated with function calls of the application,
behaviors associated with local data access caused by the application, and
behaviors associated with inbound and/or outbound traffic raised by the application.

15. The apparatus of claim 13, wherein the real-time malware detection further comprises:
re-compile at least a portion of the code of the application by at least adding a function module for acquiring logs of the behaviors of the application.

16. An apparatus comprising:
at least one processor; and
at least one memory including computer program code,
the at least one memory and the computer program code configured to, with the at least one processor, cause the apparatus to at least:
re-compile at least a portion of code of an application by at least adding a function module for acquiring logs of behaviors of the application at runtime in a real environment;
record, based at least in part on the logs of behaviors of the application, behaviors of the application at runtime of the application;
extract behavior patterns from the recorded behaviors; and
compare the extracted behavior patterns with at least one pattern of normal applications or patterns previously recorded for the application to identify abnormalities with the application.

17. The apparatus of claim 16, wherein the recorded behaviors comprises at least one of the following:
behaviors associated with function calls of the application,
behaviors associated with local data access caused by the application, and
behaviors associated with inbound and/or outbound traffic raised by the application.

\* \* \* \* \*